Patented Oct. 31, 1939

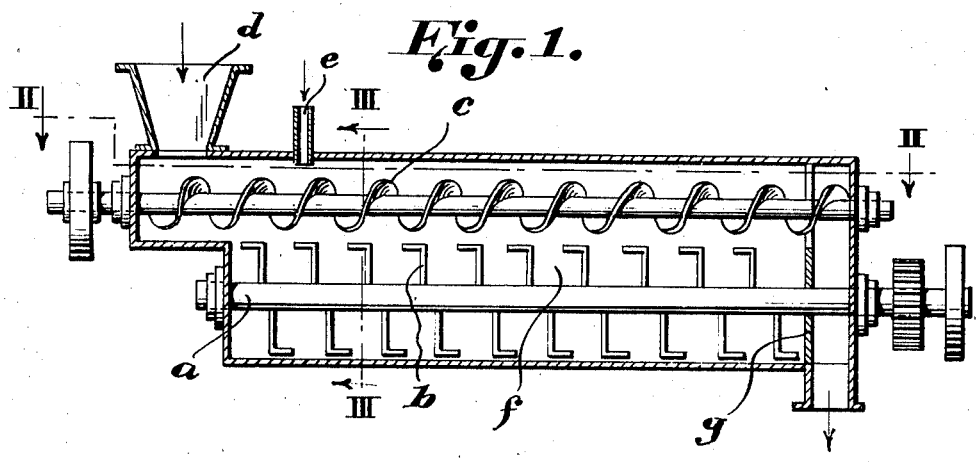
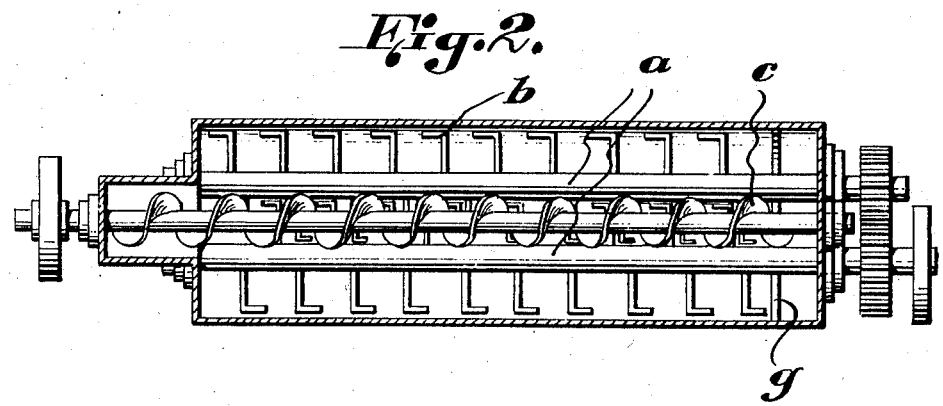
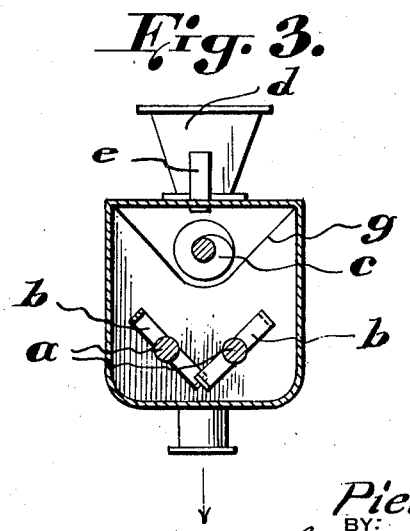

2,177,910

UNITED STATES PATENT OFFICE 2,177,910

APPARATUS FOR THE CONTINUOUS MIXING AND HOMOGENIZING OF SUBSTANCES

Pieter Smit, Amsterdam, Netherlands, assignor to N. V. Octrooien Maatschappij "Activit", Amsterdam, Netherlands Application June 30, 1938, Serial No. 216,815
In Great Britain July 12, 1937

6 Claims. (Cl. 259—6)

Various types of apparatus for mixing substances are known.

While it is comparatively easy to mix liquids and gases it is more difficult to mix solid substances or solid substances and liquids, particularly if the solid substances possess a tendency to absorb the liquids or react with them. Under the term mixing we also include the homogenizing of nonhomogenous substances.

Further the mixing is difficult if the substances are naturally tough or become so during the mixing or tend to clog together. These difficulties can in general only be overcome by effecting the mixing in an intermittent manner, in which case a disadvantage occurs in that the mixing cannot be effected sufficiently quickly when it is desired that the substances shall react with one another. Moreover this method of mixing is not very economical and requires considerable attention.

When attempting hitherto to mix substances in the continuous manner such mixing was effected in such a way that the mixing apparatus served at the same time as a conveyor and this involved disadvantages because slight deviations in the proportions of mixture of the components readily occurred. Frequently the components must be supplied intermittently and therefore if the mixing apparatus serves also as a conveyor deviations in the mixing cannot be corrected.

According to the present invention these disadvantages are overcome and the process for the continuous mixing of substances is characterized in that the mixing of the components and the conveying of the mixed components take place in separate parts of the apparatus, the conveying part being disposed above the mixing part.

The mixing part of the apparatus therefore serves exclusively for the mixing operation and the mixed substances are conveyed independently of the mixing.

The conveyance is effected in such a manner that the substances cannot pass along the conveying part of the apparatus directly but are transferred in turn to the mixing and the conveying part of the apparatus. In this way there is a gradual and regular displacement of the substances in the mixing part of the apparatus. Slight errors in the proportions of the substances to be mixed are corrected owing to the bulk of substances present in the mixing apparatus.

According to the invention the apparatus for effecting the mixing of substances comprises a mixing trough, one or two substantially horizontal shafts provided with known mixing means such as mixing hooks, a conveying screw disposed substantially horizontally and above the mixing means and a partition at the outlet end of the mixing trough arranged so that the mixed substances can only be delivered by the conveying screw.

If desired paddles may be used similar to those of the single or double paddle kneading machines employed in bakeries. These single or double paddle kneading machines are mixing machines with one or two horizontal shafts disposed side by side, said shafts being provided with mixing members for example propellers, blades or fins or mixing hooks such as those hereinafter referred to in connection with the accompanying drawing. Preferably the conveyor part of the apparatus is an ordinary conveying screw or a shaft with screw-blades. The apparatus may also be provided with means which pushes the mass intermittently into and through the mixing part of the apparatus. Such means may take the form of a reciprocating plunger or a chain with scrapers. It is of considerable importance for the invention that the substances should be retransferred to the mixing part of the apparatus after each slight displacement in a direction towards the outlet end.

To effect this operation the conveyor part of the apparatus is disposed above the mixing part of the apparatus so that the substances fall by gravity into the mixing part and are then retransferred by the mixing shafts which are disposed horizontally or in a slightly inclined direction in relation to the conveyor part of the apparatus. In this manner intimate mixing takes place while substances slowly proceed towards the outlet end of the mixing trough.

The substances can be fed in continuously or intermittently.

The invention is particularly advantageous in those cases when substances have to be mixed in the quickest possible time for instance when it is desired to have a quick reaction, for example in the case of substances used for manufacturing activated carbonaceous materials such as those described in British Specification No. 453,627.

The invention is hereinafter described by way of example with reference to the accompanying diagrammatic drawing in which:

Figure 1 is a vertical longitudinal section illustrating a preferred embodiment according to the invention.

Figure 2 is a sectional plan view taken along lines II—II of Figure 1.

Figure 3 is a cross sectional view taken on line III—III of Figure 1.

In carrying the invention into effect and with reference to the accompanying digrammaatic drawing, the horizontal shafts a provided with the mixing hooks b constitute a double paddle mixer, the shafts moving in opposite directions. The shafts also may move in the same direction at equal or preferably at different speeds. Instead of the mixing hooks shown in the drawing other mixing means of the ordinary kind can be used. Above the mixer a conveyor screw c is provided which gradually displaces the mixed substances towards the outlet. Portions of the substances, however, fall from the conveyor screw between the mixing hooks or paddles and are replaced by other portions of the substances pushed up from the mixing apparatus. This function of the apparatus is readily apparent if for instance substances of a different colour are added, in which case such added substances will gradually displace the substances present in the apparatus.

Solid substances are supplied at d and the liquids at e. The mixing trough as shown at f and a partition g are arranged to prevent discharge of substances from the mixing apparatus except by the conveyor screw.

Whenever in this specification I speak of mixing I also want to include homogenizing. When the apparatus is heated or the air is pumped out it can be used for drying wet materials. The mixing means provide a thoroughly homogenizing of the substances and a rapid and excellent drying of the wet substances is obtained. The formation of wet or dry lumps is prevented and a homogenous dry product leaves the apparatus.

Having fully described my invention, what I claim as new and desire to secure by Letters Patent, is:

1. Mixing and homogenizing apparatus comprising a longitudinal trough, a conveying screw disposed above and parallel with said trough, inlet means above and at one end of said screw for admitting material thereto, at least one shaft rotatably mounted in said trough and parallel with said screw, said shaft being provided with agitating elements and a partition disposed at the end of the trough opposed to the inlet means for permitting discharge of the material only by said conveyor screw, whereby the material carried by the conveyor screw falls by gravity from said screw into the trough and is thrown up again to said screw by said agitating elements thereby effecting the conveying of the material separately from the mixing thereof.

2. A mixing and homogenizing apparatus which comprises a mixing trough having a feed end and a discharge end, means for adding materials to be mixed at the feed end of said trough, means mounted in said trough for mixing said materials and means mounted above said mixing means for conveying the mixed materials in the upper portion of said trough to the discharge end thereof and for discharging the so-conveyed materials from said trough.

3. A mixing and homogenizing apparatus which comprises a mixing trough having a feed end and a discharge end, means including a conveyor for feeding materials to be mixed into said trough, said conveyor passing through the upper section of said trough and being adapted to convey mixed materials from the feed end to the discharge end of said trough and to discharge the mixed materials from the upper section of said trough, and means for agitating said materials during their passage through said trough mounted in said trough below said conveyor.

4. A mixing and homogenizing apparatus which comprises a substantially horizontal mixing trough having a feed end and a discharge end, a feed trough connected to the upper section of the feed end of said mixing trough, a conveyor mounted substantially horizontally in said feed trough extending through the upper section of said mixing trough and being so constructed and arranged as to convey materials in said upper section from the feed end to the discharge end of said mixing trough, means for agitating said materials in the lower section of said trough and for feeding said materials from said lower section into the path of said conveyor in the upper section of said trough, and means including said conveyor for discharging the materials from the upper section of the discharge end of said mixing trough.

5. A mixing and homogenizing apparatus which comprises a substantially horizontal mixing trough having a feed end and a discharge end, means for feeding material to be mixed into the feed end of said trough, a pair of substantially horizontal shafts carrying agitating elements mounted in the lower section of said trough and adapted to move materials from the lower section of said trough to the upper section thereof during mixing, and means mounted in the upper section of said trough above said agitators adapted to receive mixed materials from said agitators and to convey said materials to the discharge end of said trough, and means for receiving the so-conveyed materials and for conducting said materials from said trough.

6. The apparatus of claim 5 wherein the shafts carrying agitating elements are rotated in opposite directions in such manner as to feed materials upwardly into the center of the upper section of said mixing trough and wherein said conveying means is mounted in said central upper section of said trough.

PIETER SMIT.